3,723,299

HYDROGENATION PROCESS

Walter H. Seitzer, West Chester, Pa., assignor to Sun Research and Development Co., Philadelphia, Pa.
No Drawing. Filed Nov. 23, 1971, Ser. No. 201,385
Int. Cl. C10g 23/02
U.S. Cl. 208—143      4 Claims

ABSTRACT OF THE DISCLOSURE

The process of reducing the nitrogen content of a mineral oil containing aromatic hydrocarbons by hydrogenating said oil in the presence of a catalyst comprised of a Y-zeolite containing cobalt promoted with manganese or zirconium.

---

It is known in the art to effect hydrogenation of mineral oils containing aromatic hydrocarbons so as to obtain products of lower boiling range; e.g., materials in the gasoline range. For example, U.S. 3,197,398 (D. A. Young, issued July 27, 1965) discloses such a process where the catalyst used is a molecular sieve of the "X," "Y," or "L" crystal type containing a Group VIII metal. However, when cobalt on a Y-type zeolite is used in hydrogenation processes, the nitrogen compounds still are present to some exent in the hydrogenated product. This is a severe disadvantage to use of such a catalyst because of the difficulties caused by these nitrogen compounds in further processing of the hydrogenated oil.

It has now unexpectedly been found, however, that hydrocarbons such as mineral oil containing aromatic components are effectively hydrogenated to a hydrocarbon composition of less aromaticity and greater saturation and with significant removal of nitrogen compounds by hydrogating said oil in the presence of a hydrogenation catalyst consisting of a "Y" type zeolite molecular sieve which contains cobalt promoted with manganese or zirconium.

The process of this invention may be employed for the hydrogenation of substantially any mineral oil fraction boiling above the conventional gasoline range, i.e., above about 300° F., and usually above about 400° F., and having an end-boiling point up to about 1000° F., but preferably not greater than about 850° F. These feedstocks may be sulfur-free, or they may contain up to about 5% by weight of sulfur, in the form of organic sulfur compounds. The process will be most useful, however, with those feedstocks which contain nitrogen compounds, and usually the amount of nitrogen will be from about 0.5 to about 1.5% by weight. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to employ oils having an end-boiling point between about 400° and 650° F., an API gravity between about 30 and 35°, and containing at least about 20% by volume of aromatic hydrocarbons.

Hydrogenation conditions to be employed in the process of the invention will be within the following ranges:

| | Operative | Preferred |
|---|---|---|
| Temperature, ° C | 250–500 | 300–450 |
| Pressure, p.s.i.g | 400–5,000 | 1,000–2,000 |
| H./oil ratio, s.c.f./b | 1,000–15,000 | 2,000–10,000 |

The manganese and zirconium promoted cobalt catalysts are prepared with commercially available Y-type molecular sieves as the support. The Y molecular sieves having crystal pore diameters of about 9 to 10 A., and wherein the $SiO_2/Al_2O_3$ ratio is about 4–6, are preferred. The catalyst is prepared from the ammonium form of the sieve which may be obtained by treating the sodium form with ammonium chloride and then washing with water until chloride ions are no longer present. The ammonium form of the molecular sieve is then treated with an aqueous solution of the promoter element; e.g., manganese nitrate or zirconium nitrate at elevated temperatures (about 85–95° C.) for several hours and then filtered and dried at about 150° C. Then the dried material is further treated with an aqueous solution of cobalt nitrate at 85–95° C. and filtered and dried as before. The catalyst is then further heated at about 425° C. for about one to three hours to effect activation and is ready for use.

The amount of cobalt and of manganese or zirconium on the molecular sieve may each vary from about 1% to about 15% by weight, preferably about 5% to 10% each. The amount of metal on the support is readily controlled by the amount of salt used in the aqueous treating medium and by the time of treatment, which techniques are known in the art.

The promoter and cobalt combination results in a somewhat less active hydrogenation catalyst than cobalt alone, but the combination is quite desirable for use with high nitrogen containing feeds as the combination significantly reduces the nitrogen content in the hydrogenated products.

In order to further illustrate the invention the following examples are given:

EXAMPLE 1

Anthracene oil containing about 1% by weight of nitrogen is hydrogenated at 430° C. using a catalyst of 5% by weight manganese and 5% by weight of cobalt on a Y-type zeolite prepared as described above. The hydrogen uptake measured is 2200 p.s.i.g. and the product oil contains only 0.1% nitrogen.

When the hydrogenation is repeated with a catalyst of cobalt on a Y-type zeolite without the manganese, the hydrogen uptake is 4100 p.s.i.g. and the nitrogen content of the oil is 0.22%.

EXAMPLE 2

Anthracene oil containing about 1% nitrogen is hydrogenated at 430° C. with a catalyst of 5% by weight cobalt and 5% by weight of zirconium prepared as described above. The hydrogen product oil contains less than 0.1% nitrogen.

It is obvious from the above description and examples that the process of the invention provides a substantial improvement in hydrogenation processes of mineral oil and thus represents a significant advance in the art.

The invention claimed is:

1. A hydrogenating process for a mineral oil fraction boiling above about 300° F. which comprises contacting said fraction with hydrogen under hydrogenation conditions and in the presence of a catalyst consisting essentially of a Y-type zeolite molecular sieve containing cobalt promoted with manganese or zirconium.

2. A hydrogenation process for a mineral oil fraction boiling above about 300° F. which comprises contacting said fraction with hydrogen under at about 250° to about 500° C. at about 400 to about 5000 p.s.i.g. and in the presence of a catalyst consisting essentially of a Y-type zeolite molecular sieve containing from about 1% to about 15% by weight cobalt promoted with from about 1% to about 15% by weight of manganese or zirconium.

3. The process of claim 2 where the catalyst is promoted with manganese.

4. The process of claim 2 where the catalyst is promoted with zirconium.

References Cited
UNITED STATES PATENTS

| | | | |
|---|---|---|---|
| 3,205,165 | 9/1965 | Hilfman | 208—254 H |
| 3,340,179 | 9/1967 | Gutberlet | 208—254 H |
| 3,383,306 | 5/1968 | Rogers et al. | 208—143 |
| 3,592,760 | 7/1971 | Young | 208—254 H |

CURTIS R. DAVIS, Primary Examiner

U.S. Cl. X.R.

208—254 H; 260—683.9